Sept. 30, 1958 J. A. PRATT 2,854,562
PROJECTED SPOTLIGHT HEAT SHIELDING APPARATUS
Filed Oct. 4, 1955 3 Sheets-Sheet 1
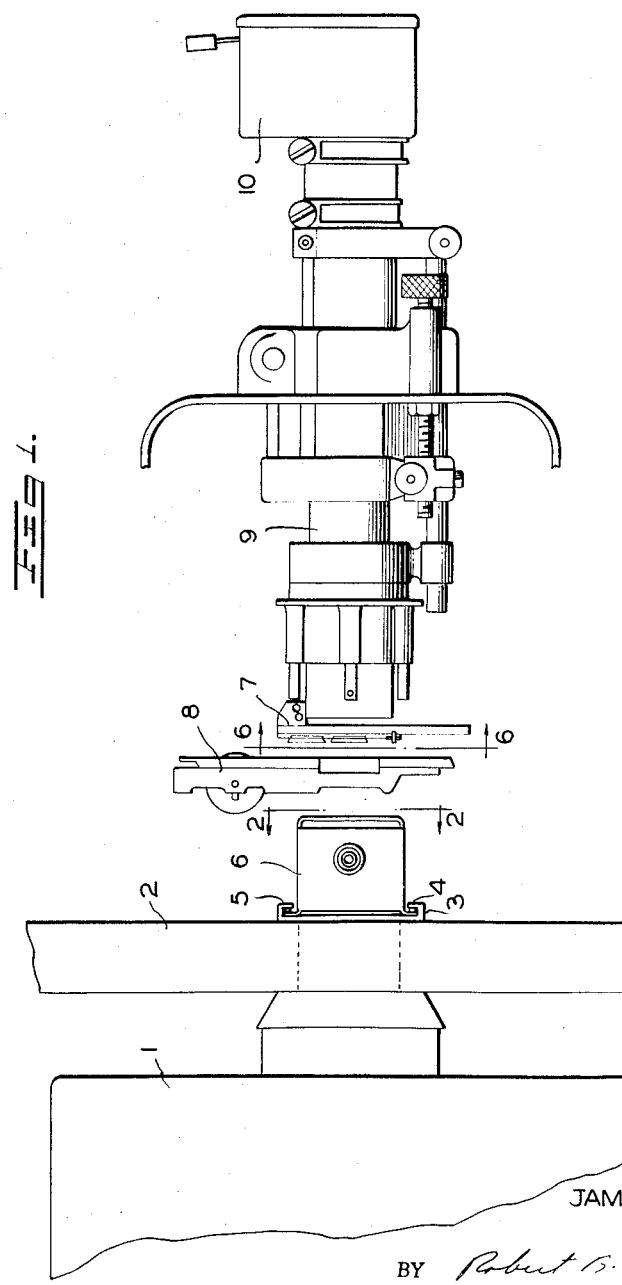
INVENTOR
JAMES A PRATT
BY *Robert G. Harmon*
ATTORNEY

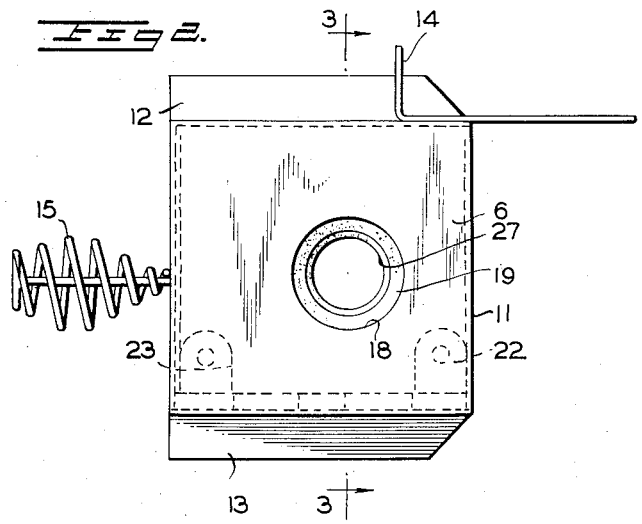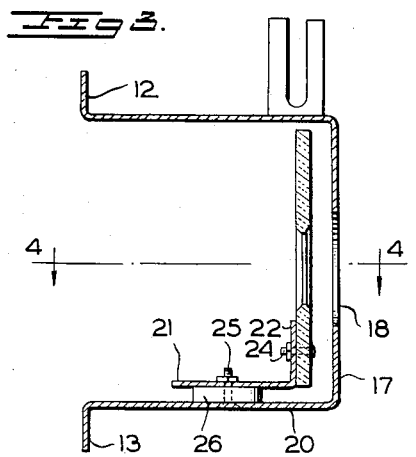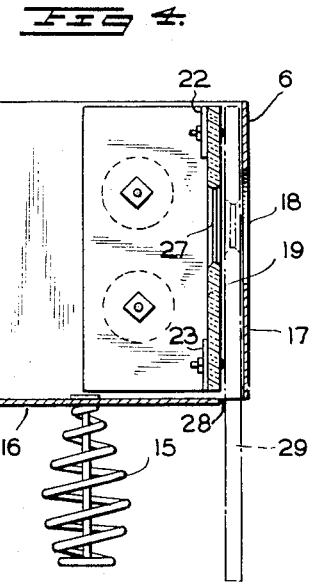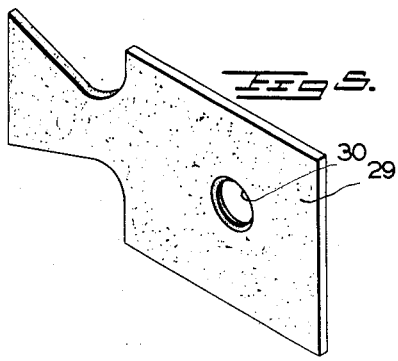

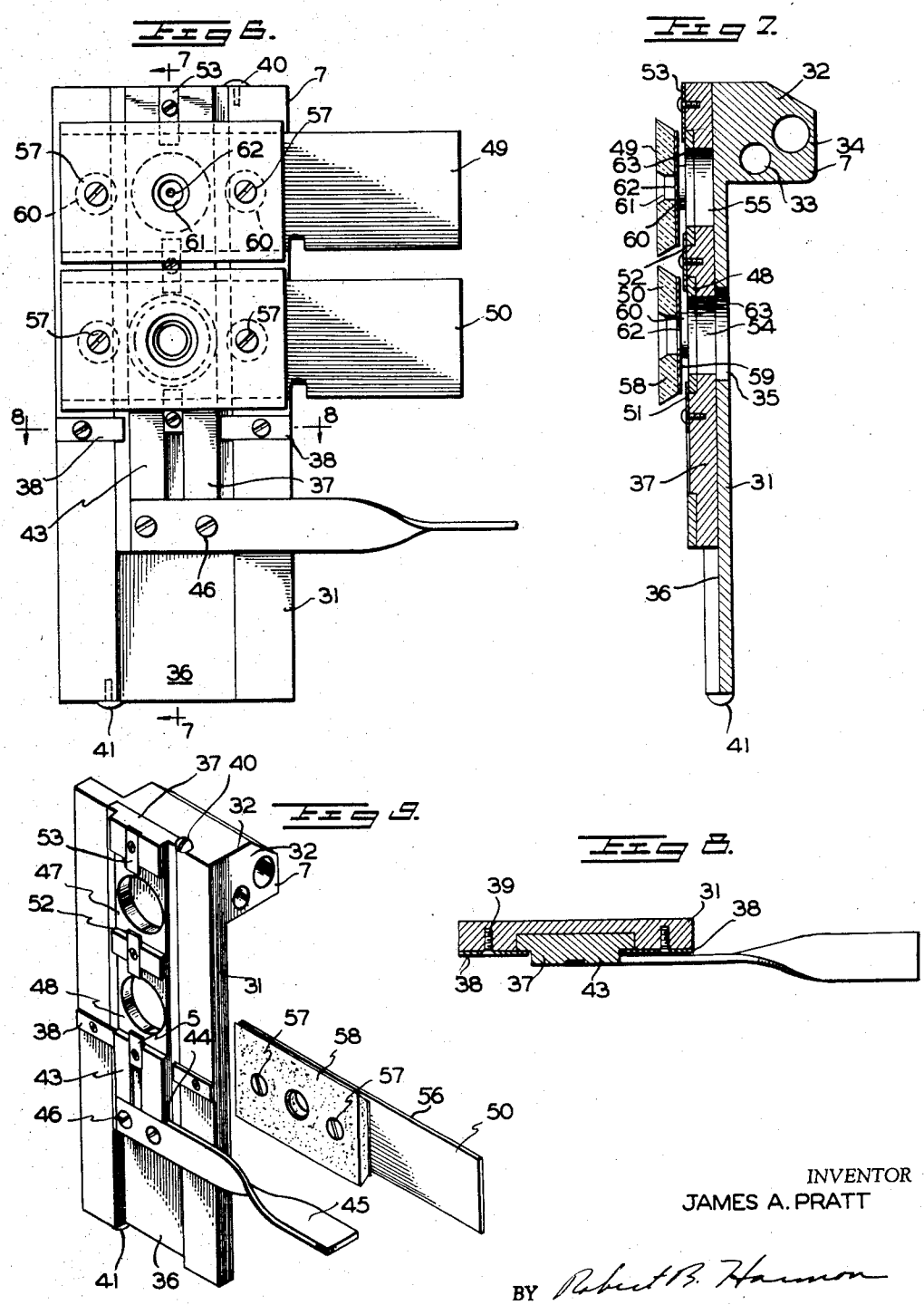

United States Patent Office 2,854,562
Patented Sept. 30, 1958

2,854,562
PROJECTED SPOTLIGHT HEAT SHIELDING APPARATUS

James A. Pratt, Washington, D. C.

Application October 4, 1955, Serial No. 538,443

3 Claims. (Cl. 240—3)

This invention relates generally to auditorium spotlight apparatus. The apparatus is most readily adapted to motion picture projectors, but any adequate source of light may be used.

The invention includes improvements and presents certain advantages over the apparatus disclosed by United States Patent No. 2,705,278 issued March 29, 1955, to this inventor.

The primary object of this invention is to provide heat control and dissipating apparatus for a spotlight projector.

A more specific object of this invention is to provide a light framing and aperture apparatus for a spotlight projector with heat control features.

Another object of this invention is to provide a novel light framing and aperture apparatus which may readily be attached to a motion picture projector at the film trap portion thereof in place of the film trap.

A further object of this invention is to provide a novel heat shield between the source of light and the light framing section of a spotlight projector.

Another object of this invention is to provide a heat shield which is interchangeable with the type of shield presently used in motion picture projectors between the light housing and the film trap.

With the foregoing and other objects in view, the invention resides in the following specification and appended claims, certain embodiments and details of construction of which are illustrated in the accompanying drawings, in which:

Figure 1 is a view in side elevation of a portion of a motion picture projector with the novel heat shield and aperture mechanism applied thereto;

Figure 2 is a view in front elevation of the heat shield taken along the lines 2—2 of Figure 1;

Figure 3 is a sectioned view in side elevation taken along the lines 3—3 of Figure 2;

Figure 4 is a sectioned plan view taken along the lines 4—4 of Figure 3;

Figure 5 is a view in perspective of heat absorbing and light-size controlling plate adapted to be removably positioned in the heat shield as shown in dot-dash lines in Figure 4;

Figure 6 is the front view of the light framing and aperture apparatus of the invention taken along the lines 6—6 of Figure 1;

Figure 7 is a sectioned view in side elevation of the light framing and aperture apparatus taken along the lines 7—7 of Figure 6;

Figure 8 is a detail section view of the light framing and aperture apparatus taken along the lines 8—8 of Figure 6; and Figure 9 is a perspective view of the light framing and aperture apparatus with a particular aperture plate in position to be mounted thereon.

Lamp boxes suitable for spotlight projection purposes, and particularly motion picture projector lamp housings, give off a large amount of heat. In utilizing the spotlight directing attachment described and claimed in Patent No. 2,705,278 particularly with motion picture projectors it has been found desirable to reduce and control the amount of heat reaching the film trap position of the projector. By adequately dissipating the heat it becomes possible manually to operate the size and shaping slides utilized in connection with spotlight operation as will be described in detail herein.

While the instant invention is particularly adaptable to motion picture projectors, it is quite obvious that it is readily adaptable to light boxes other than motion picture projectors for spotlight operation.

Referring more particularly to Figure 1, a lamp housing 1 of a motion picture projector is shown having a shutter assembly 2. Secured to the front of the assembly 2 is a bracket 3 having inwardly directed flanges 4 and 5 to slidably receive and support a heat shield assembly 6. A light aperture assembly 7 is connected to the projector adjacent the film guide assembly 8 in lieu of the standard film trap assembly which is readily removable when spotlight operation is desired. Forwardly of the assembly 7 is the usual projector lens assembly 9 to which is attached the light directing attachment 10 of Patent No. 2,705,278. By special and novel construction of the shield assembly 6 and the aperture assembly 7 light is passed from the lamp housing 1 forwardly to the attachment 10 with a greatly reduced amount of heat at the assembly 7. The light framing plates to be described later in the specification may then be inserted in and removed from the assembly 7 without burning the fingers.

Referring now to Figures 2, 3, 4 and 5 of the drawings, it will be readily recognized that the heat shield assembly 6 is a novel modification of a somewhat similar assembly used in motion picture projectors. The assembly 6 consists of a casing 11 formed of sheet metal with one side thereof completely open. The top and bottom walls of casing 11 are provided with outwardly directed flanges 12 and 13 to engage the flanges 5 on the projector shutter mechanism 2. Secured by suitable means to the top of the assembly 6 is a bracket 14 which acts as a stop in connection with projector parts (not shown) when sliding the shield assembly into position on the shutter mechanism 2. A handle 15 is attached to the wall 16 of assembly 6 by suitable means, preferably by welding. The front wall 17 of assembly 6 is provided with a light aperture 18 which controls the size of the light beam passing forwardly in the projector from lamp housing 1. The assembly thus effectively confines the emission of light rays to the forward direction in the projector through aperture 18. To reduce the amount of heat transmitted to the assembly 6 and more particularly to the handle 15, a heat absorbing wall 19 is provided within the assembly 6. Wall 19 is secured to the bottom wall 20 of assembly 6 by means of a bracket 21. This bracket 21 has upstanding ears 22 and 23 to which wall 19 is secured by screws 24. Bracket 21 is fastened to the bottom wall 20 in spaced relationship thereto by screws 25 which project through standoff heat insulating washers 26 positioned between the wall and the bracket. The bracket 21 thus carries the wall 19 in spaced relationship with regard to the front wall 17 of assembly 6 for a purpose to be described. A light aperture 27 is provided in wall 19 in alignment with aperture 18 in wall 17. With the wall 19, preferably made of a high heat-absorbing asbestos-like material, mounted in this manner the amount of light directed into contact with the walls of assembly 6 is reduced to a minimum. In other words, the light rays coming from lamp housing 1 either go through apertures 27 and 18 or they impinge on the heat wall 19. The only path of good heat conductivity between the wall 19 and the assembly 6 is through the screws 25 and bracket 21.

Since the screws 25 are so small, any heat transmitted is readily dissipated by the bottom wall 20. Therefore the assembly 6, and more particularly the handle 15, does not become too hot to handle with the fingers when it is desired to reconvert the projector to motion picture operation.

To further reduce the size of the light beam leaving aperture 18 of assembly 6 and the attendant heat of the beam, the side wall 16 is provided with an opening 28 into which a second heat wall 29 may be inserted. The wall 29 is provided with an aperture 30 which aligns with apertures 27 and 18 when the wall is fully inserted into assembly 6 between front wall 17 and the heat wall 19. Aperture 30 is of considerably smaller diameter than aperture 27 and hence less light and heat will be directed forwardly from assemly 6. Heat wall 29 is preferably of the same high heat absorbing material as the wall 19.

To control the actual size and shape of the light beam in a projector the light aperture assembly 7 is provided between the film guide assembly 8 and the lens assembly 9. The assembly 7 is clearly shown in Figures 6, 7, 8 and 9 of the drawings. The assembly 7 includes a plate 31 which is provided with an integral hub 32 having bores 33 and 34 therethrough to receive mounting studs (not shown) of the projector which normally carry the removable film trap. The plate 31 is further provided with a relatively large aperture 35 and a longitudinal guide channel 36. Slidably received in channel 36 is an aperture plate changer 37 which is retained in channel 36 by spring clips 38 secured by screws 39 to plate 31.

To prevent the changer from leaving the channel 36 lengthwise of the plate 31 screws 40 and 41 are screwed into the plate 31, one at either end, with their heads overlapping the channel 36. Obviously there are many possible structural variations which could be utilized to do this job.

The changer 37 consists of a base portion 42 which rides flush with channel 36 and a raised portion 43. The raised portion 43 is cutaway at 44 to provide for the reception of on operating handle 45 which is secured to the changer 37 by screws 46. The raised portion 43 of changer 37 is further cutaway at 47 and 48 for the reception of aperture slides 49 and 50. The slides 49 and 50 are removably held in position on changer 37 by spring clips 51, 52 and 53. It is thus seen that the changer 37 is free to move in channel 36 against the friction of the channel and the spring clips 38 so that either aperture 54 or 55 provided in the base portion 42 may be maintained in alignment with aperture 35 in plate 31. Apertures 54 and 55 are centrally aligned with respect to the cutaway sections 47 and 48 of the changer 37. The changer 37 is of such a length that either end thereof will abut a screw 40 or 41 when either the aperture 54 or 55 is aligned with aperture 35 in the plate 31.

The slides 49 and 50 and replacements therefor are of the same construction, the only difference being in the size or shape of the light aperture. The slide 50 includes a mounting plate 56 to which is secured by metal screws 57 a heat wall 58. Lying adjacent the rear surface of wall 58 is a relatively thin metal plate 59 which together with wall 58 is spaced from plate 56 by standoff washers 60 about screws 57. The space thus provided between plate 59 and plate 56 provides room for the clips 52 and 51 frictionally to grip and retain the plate in sliding relationship and also reduces measurably the amount of heat collected on wall 58 which may be transmitted to the plate 56. The plate 56 may, after considerable usage in the projector, be removed from the changer 37 without danger of burning the fingers.

The wall 58, plate 59 and plate 56 are all provided with apertures 61, 62 and 63, respectively, which are in concentric alignment. The aperture of the plate 59 is somewhat smaller than the aperture in the wall 58 and is considerably smaller than the aperture in plate 56. This reduced size aperture in plate 59, which is quite thin relative to the other plates, creates a sharp edge for a light beam passing therethrough, thereby providing a well defined spotlight beam.

The aperture 62 in metal plate 59 may be of various shapes and sizes to control accordingly the projected light beam contour according to theatre requirements. Thus when slide 50 is aligned for projection as in the drawings, the slide 49 may be rapidly withdrawn and replaced with another having a different type of aperture 62 in the plate 59. The newly inserted slide 49 may then be brought into projection alignment by moving the slide changer 37 downwardly by handle 45 as viewed in the drawings. At this point the slide 50 may be withdrawn and replaced witho uitnterrupting the projected light beam.

The heat collecting walls 58 of the slides 49 and 50 with their standoff relationship to the slide mounting plates 56 prevent the plates 56 from becoming too hot to handle with the operator's fingers.

Thus it is seen that the invention provides a novel and practical system and apparatus for heat control in the utilization of a motion picture projection apparatus for spotlight operation.

To reconvert the projector to normal use it is only necessary to remove the attachment 10, the light aperture assembly 7 and the heat shield assembly 6. This is easily accomplished in less than thirty seconds. The reinstallation of the usual light guard in the same location as assembly 6 and the film trap mechanism in lieu of the assembly 7 takes an equally minimum amount of time. With this replacement accomplished the projector is again in condition for motion picture projection.

It is readily obvious that various structural modifications of assemblies 6 and 7 are well within the knowledge of the inventor or others skilled in the art and the inventor intends to be limited thereto only in accord with the appended claims.

I claim:

1. A heat shield assembly for a motion picture projector including a lamp housing and utilized as a spotlight apparatus comprising means to removably attach the assembly to the projector adjacent the lamp housing, a wall with an aperture on the assembly to permit light from the lamp housing to project from the lamp housing through the assembly, and a heat absorbing wall mounted within said assembly substantially parallel to and spaced from said apertured wall, said heat absorbing wall being provided with an aperture in alignment with but smaller than the aperture of said assembly wall and said wall absorbing the heat of the light received by the assembly from the lamp housing and not passed through the aligned apertures.

2. The heat shield assembly of claim 1 and being further provided with a second heat controlling and light beam size controlling wall which is slidably received in the assembly parallel to and between the heat absorbing wall and the apertured wall of the assembly, said light beam size controlling wall being of heat absorbing material and having an aperture in alignment with, but much smaller than, the apertures in the assembly or heat absorbing walls.

3. An aperture plate changer assembly for spotlight apparatus including a lamp housing and a lens assembly which comprises a mounting plate secured to the apparatus between the lamp housing and the lens assembly, said mounting plate being provided with an aperture, a plurality of plates with apertures, means to slidably carry said apertured plates individually into alignment with the aperture of the mounting plate, an apertured heat absorbing wall mounted on the light receiving side of each aperture plate and in spaced relationship thereto, and a relatively thin light beam defining plate with an aperture mounted between said heat absorbing wall and the aperture plate, the apertures of the wall, the aperture plate and the defining plate being normally in alignment to pass a beam of light from the lamp housing, the aperture of the defining plate being smaller than the other apertures to define a sharp-edged spotlight beam.

References Cited in the file of this patent

UNITED STATES PATENTS

| | | |
|---|---|---|
| 1,518,141 | Gage | Dec. 9, 1924 |
| 1,591,206 | Baum | July 6, 1926 |
| 1,866,549 | Dina | July 12, 1932 |
| 1,981,033 | Dina | Nov. 20, 1934 |
| 2,246,971 | Brenkert | June 24, 1941 |
| 2,464,887 | Osterberg | Mar. 22, 1949 |
| 2,705,278 | Pratt | Mar. 29, 1955 |